United States Patent
Miskovic et al.

(10) Patent No.: US 6,448,193 B1
(45) Date of Patent: Sep. 10, 2002

(54) MOISTURE-SETTING POLYURETHANE ADHESIVE

(75) Inventors: Michel Miskovic, Compiegne; François Bauduin; Patrick Bouttefort, both of Margny-Les-Compiegne; Jean-François Chartrel, Cuts, all of (FR)

(73) Assignee: Atofina, Paris (FR)

( * ) Notice: Subject to any disclaimer, the term of this patent is extended or adjusted under 35 U.S.C. 154(b) by 0 days.

(21) Appl. No.: 09/622,169

(22) PCT Filed: Dec. 17, 1998

(86) PCT No.: PCT/FR98/02764

§ 371 (c)(1),
(2), (4) Date: Aug. 14, 2000

(87) PCT Pub. No.: WO99/32569

PCT Pub. Date: Jul. 1, 1999

(30) Foreign Application Priority Data

Dec. 19, 1997  (FR) ............................................. 97 16201

(51) Int. Cl.⁷ ................................................ C08L 75/00
(52) U.S. Cl. ........................... 442/30; 442/56; 442/221; 442/315; 524/507
(58) Field of Search ............................ 524/507; 442/30, 442/56, 221, 315

(56) References Cited

U.S. PATENT DOCUMENTS

| 4,460,737 | A | * | 7/1984 | Evans ........................ 524/584 |
| 4,585,819 | A |   | 4/1986 | Reischle et al. |
| 4,820,368 | A | * | 4/1989 | Markevka ................. 156/307.3 |
| 4,891,269 | A | * | 1/1990 | Markevka .................... 428/423 |
| 6,022,925 | A | * | 2/2000 | Tomko ........................ 524/547 |
| 6,121,354 | A | * | 9/2000 | Chronister .................. 524/262 |

FOREIGN PATENT DOCUMENTS

| EP | 0 293 602 | 12/1988 |
| EP | 0 383 505 | 8/1990 |
| JP | 56 116770 | 9/1981 |
| JP | 04 106179 | 4/1992 |
| WO | 98/58003 | 12/1998 |

* cited by examiner

Primary Examiner—Paul R. Michl
(74) Attorney, Agent, or Firm—Hunton & Williams

(57) ABSTRACT

A moisture-crosslinkable polyurethane adhesive, comprising a) 70 to 95% by weight of a polyurethane polyaddition prepolymer comprising units of at least one polyol and at least one polyisocyanate and, b) 5 to 30% by weight of an essentially amorphous poly-α-olefin, the adhesive comprising a content of free NCO groups representing 1 to 20% by weight of the adhesive.

22 Claims, No Drawings

MOISTURE-SETTING POLYURETHANE ADHESIVE

BACKGROUND OF THE INVENTION (i) Field of the Invention

The invention relates to a moisture-crosslinkable polyurethane adhesive, to a process for adhesively bonding a textile and a cellular material by means of the adhesive and to the adhesively bonded assemblies thus obtained.

(ii) Description of the Related Art

The adhesive bonding of a textile and of a cellular material is generally carried out by flame brushing. Flame brushing consists in modifying the surface condition of the material by a flame treatment, in order to render it capable of adhesive bonding.

The adhesive bonding of textiles to films of a cellular material, such as a foam, is carried out industrially on a production line comprising the successive stages of flame brushing the foam, of placing the textile on the foam, and of calendering and of winding off the final adhesively bonded assembly.

This technique exhibits the following disadvantages:

part of the foam is destroyed during the flame treatment, the use of the flame makes the process dangerous from the view point of the risk of fire, on the one hand, and of the possible production of gases which are harmful to the users and to the environment, on the other hand, the production rate is limited to 50 meters per minute, it is difficult to control the flame brushing of thin films, which does not allow the formation of adhesively bonded assemblies of low thickness, polyurethane foams cannot be treated according to this technique, and, finally, the flame brushing stiffens the surface of the foam, which makes the textile surface of the assembly hard to the touch.

It has now been found that it is possible to overcome the abovementioned disadvantages by carrying out the adhesive bonding of the textile to the cellular material by means of a novel adhesive, which adhesive is preferably deposited on the textile.

The invention thus relates to a moisture-crosslinkable polyurethane adhesive which comprises:

a) 70 to 95% by weight of a polyurethane prepolymer obtained by polyaddition of at least one polyol to at least one polyisocyanate and, b) 5 to 30% by weight of an essentially amorphous poly-α-olefin, the content of free NCO groups representing 1 to 20% by weight of the adhesive.

The moisture-crosslinkable polyurethane adhesive preferably comprises:

a) 85 to 95% by weight of a polyurethane prepolymer obtained by polyaddition of at least one polyol to at least one polyisocyanate and, b) 5 to 15% by weight of an essentially amorphous polyolefin, the content of free NCO groups representing 1 to 10% by weight of the adhesive.

The polyol participating in the formation of the prepolymer is generally chosen from polyether polyols, polyester polyols and unsaturated polyols.

The polyether polyols are generally chosen from aliphatic and aromatic polyether polyols and mixtures of these compounds. Their average molecular mass is preferably between 200 and 9000 and their hydroxyl functionality is preferably between 2 and 4.6.

Mention may be made, as examples of aliphatic polyether polyols, of oxyalkylated derivatives of diols, such as polypropylene glycols, or of triols, such as glycerol, trimethylolpropane and hexane-1,2,6-triol, polymers of ethylene, propylene or butylene oxide, copolymers of ethylene oxide and of propylene oxide, the abovementioned compounds containing silanyl endings, and oxyalkylated diphenyl derivatives, such as derivatives oxyethylenated or oxypropylenated in the 4,4'-position of diphenylmethane.

Use is preferably made of oxypropylated derivatives of glycerol, polymers of propylene or butylene oxide, and copolymers of ethylene oxide and of propylene oxide.

The polyester polyols are generally chosen from aliphatic and aromatic polyester polyols and mixtures of these compounds. Their average molecular mass is preferably between 250 and 7000 and their hydroxyl functionality is preferably between 2 and 3.

Mention may be made, by way of examples, of the polyester polyols resulting from the condensation of aliphatic, cyclic or aromatic polyols, such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldimethanolamine and mixtures of these compounds, with an acid, such as 1,6-hexanedioic acid, dodecanedioic acid, azelaic acid, sebacic acid, adipic acid, 1,18-octadecanedioic acid, phthalic acid, succinic acid and mixtures of these acids, an unsaturated anhydride, such as maleic or phthalic anhydride, or a lactone, such as caprolactone.

Use is preferably made of the polyester polyols resulting from the condensation of ethanediol, 1,3-propanediol and/or 1,6-hexanediol with adipic acid and/or phthalic acid.

The unsaturated polyols are generally chosen from polyols and mixtures of polyols preferably having a molecular mass of between 1200 and 3000.

Mention may be made, by way of examples, of polybutadiene and polyisoprene containing hydroxylated endings.

The abovementioned polyols are advantageously amorphous.

The abovementioned polyols can also be used as a mixture with other hydroxylated compounds.

It is thus possible to use a monol or a mixture of monols, in particular poly(ethylenelbutylene)monols, such as Kraton Liquid™ L-1203 Polymer, sold by Shell, or a polyol or a mixture of polyols chosen from poly(ethylene/butylene) diols, such as Kraton Liquid™ Polymer HPVM-2203, sold by Shell, copolymers of ethylene, of vinyl acetate and of 2-hydroxyethyl acrylate, such as Orevac® 9402, sold by Elf Atochem, indenelcoumarone resins modified by phenol, for example Novares CA120, sold by VFT, and hydroxylated tackifying resins, for example Reagem, sold by DRT.

The abovementioned monol and the abovementioned polyol respectively represent 0 to 10% and 0 to 25% by weight of the polyols.

The polyisocyanate is generally chosen from aliphatic, cycloaliphatic or aromatic polyisocyanates well known to a person skilled in the art and mixtures of these compounds.

Mention may be made, by way of examples of aliphatic polyisocyanates, of hexamethylene diisocyanate (HMDI), ethylene diisocyanate, ethylidene diisocyanate, propylene diisocyanate, butylene diisocyanate, dichlorohexamethylene diisocyanate, furfurylene diisocyanate and mixtures of these compounds.

Mention may be made, by way of examples of cycloaliphatic polyisocyanates, of isophorone diisocyanate (IPDI), cyclopentylene 1,3-diisocyanate, cyclohexylene 1,4-diisocyanate, cyclohexylene 1,2-diisocyanate and mixtures of these compounds.

Mention may be made, by way of examples of aromatic polyisocyanates, of diphenylmethane diisocyanate, in particular 4,4'-diphenylmethane diisocyanate (MDI), 2,4'-diphenylmethane diisocyanate and 2,2'-diphenylmethane diisocyanate, toluene diisocyanate, in particular 2,4-toluene diisocyanate (TDI) and 2,6-toluene diisocyanate, 2,2-diphenylpropane 4,4'-diisocyanate, p-phenylene diisocyanate, m-phenylene diisocyanate, xylene diisocyanate, 1,4-naphthalene diisocyanate, 1,5-naphthylene diisocyanate, azobenzene 4,4'-diisocyanate, diphenyl sulphone 4,4'-diisocyanate, 1-chlorobenzene 2,4-diisocyanate and mixtures of these compounds.

Use is preferably made of diisocyanates and more particularly of MDI, 2,4'-diphenylmethane diisocyanate, 2,2'-diphenylmethane diisocyanate, TDI, 2,6-toluene iisocyanate, HMDI and IPDI.

The polyurethane prepolymer is obtained by polyaddition of at least one polyol and of at least one polyisocyanate in amounts such that the content of isocyanate groups in the prepolymer is between 1 and 25% and preferably 2 and 15% by weight.

The nature of the polyurethane prepolymer is capable of influencing the hardness of the adhesive according to the invention. In this respect, preference is given to the polyurethane prepolymers obtained by reaction:
of a mixture of polyols composed:
of 20 to 100% by weight of an aliphatic polyester polyol,
and of 0 to 80% by weight of an aliphaticlaromatic polyester polyol
and of at least one polyisocyanate.

Preference is more particularly given to the polyurethane prepolymers obtained by reaction:
of a mixture of polyols composed:
of 30 to 50% by weight of an aliphatic polyester polyol,
and of 70 to 50% by weight of an aliphatic/aromatc polyester polyol
and of at least one polyisocyanate.

The essentially amorphous poly-α-olefin (APAO) is generally chosen from polymers resulting from the copolymerization of monomers chosen from ethylene, propene, 1-butene and 1-hexene in the presence of a catalyst of Ziegler-Natta type and mixtures of these copolymers. Mention may be made, by way of examples, of Vestoplast®, in particular referenced 508, sold by Hüls, Eastoflex®, sold by Eastman Chemical, and Rextac®, sold by Rexen. Preference is given to copolymers having a molecular mass of between 7300 and 23,800 and a glass transition temperature of between −27 and −36° C. Use is advantageously made of copolymers having a ringand-ball softening point (DIN Standard 52011) of between 80 and 160° C.

The moisture-crosslinkable adhesives according to the invention can comprise conventional additives known to a person skilled in the art, such as fillers, tackifying agents, plasticizers, adhesion promoters, such as compounds containing silanyl groups, and catalysts which accelerate the crosslinking by moisture, for example metal catalysts, such as dibutyltin dilaurate, or amine-containing catalysts, such as dimorpholinodiethyl ether.

The moisture-crosslinkable polyurethane adhesives according to the invention can be prepared by reacting the polyols and, if appropriate, the other hydroxylated compounds, optionally dehydrated at high temperature under vacuum, with the polyisocyanates with the exclusion of moisture and, if appropriate, under a protective gas, at a temperature which can vary from 90 to 120° C. After the initiation of the reaction, the poly-α-olefin is added, by mixing, in the desired quantitative ratios and the reaction is allowed to continue until the desired NCO content is obtained. The optional additives are added, by mixing, to the adhesive thus obtained.

The moisture-crosslinkable polyurethane adhesives according to the invention are particularly suited to the adhesive bonding of textiles, such as meshes (knitted fabrics), velvets and synthetic warps and wefts, for example made of polyamide or of poly(ethylene terephthalate), to foams, for example made of polyethylene, of polypropylene, of polyether, of polyester or of polyurethane.

The adhesives according to the invention make it possible to carry out an adhesive bonding under industrial conditions, that is to say at a high rate of the order of 300 meters per minute.

The adhesives according to the invention in addition exhibit an excellent trapping power (ability of the adhesive to fix a material) and excellent flexibility to the touch.

The textiles adhesively bonded to a foam film using the adhesive according to the invention can be used, for example, as wall coverings or coverings for seats or for the interior trim of automobiles.

The following examples allow the invention to be illustrated.

EXAMPLE 1

The following compounds are introduced into a reactor under a nitrogen atmosphere:
21 parts by weight of 4,4'-diphenylmethane diisocyanate (MDI),
25 parts by weight of the condensation product of adipic acid and of a mixture of 2,2-dimethyl-1,3-propanediol, 1,2-ethanediol and 1,6-hexanediol (aliphatic polyester polyol; hydroxyl number: 18–24; molecular mass: 5000; OH functionality: 2; trade name: Dynacoll® 7250-Hüls),
44 parts by weight of the condensation product of a mixture of 1,3-benzenedicarboxylic acid and adipic acid and of a mixture of 1,4-benzenedicarboxylate, 2,2-dimethyl-1,3-propanediol, 1,2-ethanediol and 3-hydroxy-2,2-dimethylpropyl 3-hydroxy-2,2-dimethylpropanoate (aliphatic/aromatic polyester polyol; hydroxyl number: 31–39; molecular mass: 3000; OH functionality: 2; trade name: Dynacollo 7130-Hüls).

The mixture is brought to a temperature of the order of 95 to 100° C. When the temperature is stable, 10 parts by weight of copolymer of ethylene, of 1-propene and of 1-butene (molecular mass: 11,800; glass transition temperature: −31° C.; viscosity at 190° C.: 7800 mPa's; ring-and-ball softening point (DIN Standard 52011): 86° C.; trade name: Vestoplast® 508-Hüls) are introduced into the reactor.

After completion of the reaction, a white adhesive is recovered which is solid at 23° C. and which has an NCO content equal to 5.2%, measured according to AFNOR Standard T52-132.

At 130° C., the adhesive is a white liquid which exhibits a tackiness and a Brookfield viscosity equal to 2600 mPa's. On cooling, the adhesive exhibits elastic properties.

The adhesive is used for the industrial lamination of a film of polyurethane foam to a polyamide textile mesh. The molten adhesive at 120° C. is deposited by means of a stationary lip nozzle with a length of 300 mm (weight per unit area of the adhesive: 8 g/m$^2$) on the textile mesh which progresses at the rate of 100 meters per minute.

It is found that there exists no wicking up of the adhesive on the nozzle and that the wetting of the mesh by the adhesive is satisfactory. It is also observed that the adhesive does not pass through the textile mesh.

The assembly obtained is placed in a controlled-environment chamber at 23° C. and 50% relative humidity for 1 week.

The assembly is cut into strips with a width of 25 mm and the outer polyurethane face is reinforced with an adhesive tape. The strips obtained are subjected to a 180° peel tension at a constant rate of 100 mm/min (Type DY 30 test machine; Adamel-L'Homargy). The measurements are carried out on 5 strips.

The peel strength is equal to 6.3 N/5 cm (with delamination from the substrates).

EXAMPLE 2

Comparative

The preparation is carried out under the conditions of Example 1, modified in that Vestoplast® 508 is not used.

An adhesive is recovered which is solid at 23° C., which has an NCO content equal to 5.7% and a Brookfield viscosity at 130° C. equal to 2300 mPa's, and which exhibits a lower tackiness than that of Example 1.

It is observed that the product wicks up on the nozzle and that wetting of the textile mesh by the adhesive is absent when the rate of progression of the textile mesh is greater than 10 meters per minute.

The adhesively bonded assembly obtained at the rate of 10 meters per minute exhibits a peel strength equal to 6.05 N/5 cm (with delamination from the substrates) after polymerizing for a week.

EXAMPLE 3

The preparation is carried out under the conditions of Example 1, modified in that:

1/ 21.5 parts by weight of MDI, 24 parts by weight of Dynacoll® 7250, 43 parts by weight of Dynacoll® 7130 and 9.9 parts by weight of Vestoplast® 508 are used, 2/ and after the completion of the reaction, 1.6 part by weight of gamma aminopropyltrimethoxysilane (trade name: Silques A-1110 silane-OSI) is introduced, and the temperature is maintained at 75–80° C. until the NCO content is reached.

The recovered adhesive is solid at 23° C. and has a NCO content equal to 5.1% and a Brookfield viscosity equal to 3200 mpa's at 130° C. On cooling, the adhesive exhibits elastic properties.

What is claimed is:

1. An adhesive-bonding process, comprising adhesively bonding a textile and a cellular material with a heterogeneous adhesive, said adhesive comprising:

a. 70% to 95% by weight of a polyurethane polyaddition prepolymer comprising units of at least one polyol and at least one polyisocyanate, b. 5% to 30% by weight of an essentially amorphous poly-α-olefin, and c. 1% to 20% by weight of free NCO groups.

2. The process of claim 1, wherein said heterogeneous adhesive does not comprise a tackifying resin.

3. The process of claim 1, wherein said heterogeneous adhesive comprises solid particles.

4. The process of claim 3, wherein said solid particles allow retention of the active part of said heterogeneous adhesive on said textile.

5. The process of claim 1, wherein said poly-α-olefin is a copolymerization product, said copolymerization product comprising ethylene, propene, 1-butene, or 1-hexene in the presence of a Ziegler-Natta catalyst or a mixture of said copolymerization products.

6. The process of claim 5, wherein said poly-α-olefin has a molecular mass of between 7,300 and 23,800 and a glass transition temperature of between −27° C. and −36° C.

7. The process of claim 1, wherein said polyol comprises a polyether polyol, a polyester polyol or an unsaturated polyol.

8. The process of claim 7, wherein said polyol comprises a polyester polyol having an average molecular mass of between 250 and 7,000 and an OH functionality of between 2 and 3.

9. The process of claim 8, wherein said polyester polyol is a condensation product of polyols with an acid, an unsaturated anhydride, or a lactone, said polyols comprising ethanediol, 1,2-propanediol, 1,3-propanediol, glycerol, trimethylolpropane, 1,6-hexanediol, 1,2,6-hexandetriol, butenediol, sucrose, glucose, sorbitol, pentaerythritol, mannitol, triethanolamine, N-methyldimethanolamine, or a combination thereof.

10. The process of claim 9, wherein said acid comprises 1,6-hexanedioic acid, dodecanedioic acid, azalaic acid, sebacic acid, adipic acid, 1,18-octadecanedioic acid, phthalic acid, succinic acid, or a combination thereof.

11. The process of claim 9, wherein said unsaturated anhydride comprises maleic or phthalic anhydride.

12. The process of claim 9, wherein said lactone comprises caprolactone.

13. The process of claim 9, wherein said polyester polyol is a condensation product of at least one of ethanediol, 1,3-propanediol and 1,6-hexanediol with at least one of adipic acid and phthalic acid.

14. The process of claim 1, wherein said polyisocyanate comprises aliphatic polyisocyanate, cycloaliphatic polyisocyanate, aromatic polyisocyanate, or a combination thereof.

15. The process of claim 14, wherein said polyisocyanate is a diisocyanate.

16. The process of claim 15, wherein said diisocyanate is MDI, 2,4'-diphenylmethane diisocyanate, 2,2'-diphenylmethane diisocyanate, TDI, 2,6-toluene diisocyanate, HMDI or IPDI.

17. The process of claim 1, wherein said polyurethane polyaddition prepolymer comprises:
   a. a mixture of polyol units comprising:
      i. 20% to 100% by weight of an aliphatic polyester polyol, and
      ii. 0% to 80% by weight of an aliphatic or aromatic polyester polyol; and
   b. at least one polyisocyanate.

18. The process of claim 17, wherein said polyurethane polyaddition prepolymer comprises:
   a. a mixture of polyol units comprising:
      i. 30% to 50% by weight of an aliphatic polyester polyol, and
      ii. 70% to 50% by weight of an aliphatic or aromatic polyester polyol; and
   b. at least one polyisocyanate.

19. The process of claim 1, wherein said textile comprises a mesh, a knitted fabric, a velvet, synthetic warps, or synthetic wefts.

20. The process of claim 1, wherein said cellular material is a foam film.

21. The process of claim 20, wherein said foam film comprises polyethylene, polypropylene, polyether, polyester, or polyurethane.

22. An assembly, comprising a textile and a cellular material adhesively bonded with a heterogeneous adhesive, said adhesive comprising:
   a. 70% to 95% by weight of a polyurethane polyaddition prepolymer comprising units of at least one polyol and at least one polyisocyanate,
   b. 5% to 30% by weight of an essentially amorphous poly-α-olefin, and
   c. 1% to 20% by weight of free NCO groups.

* * * * *